Figure 6:
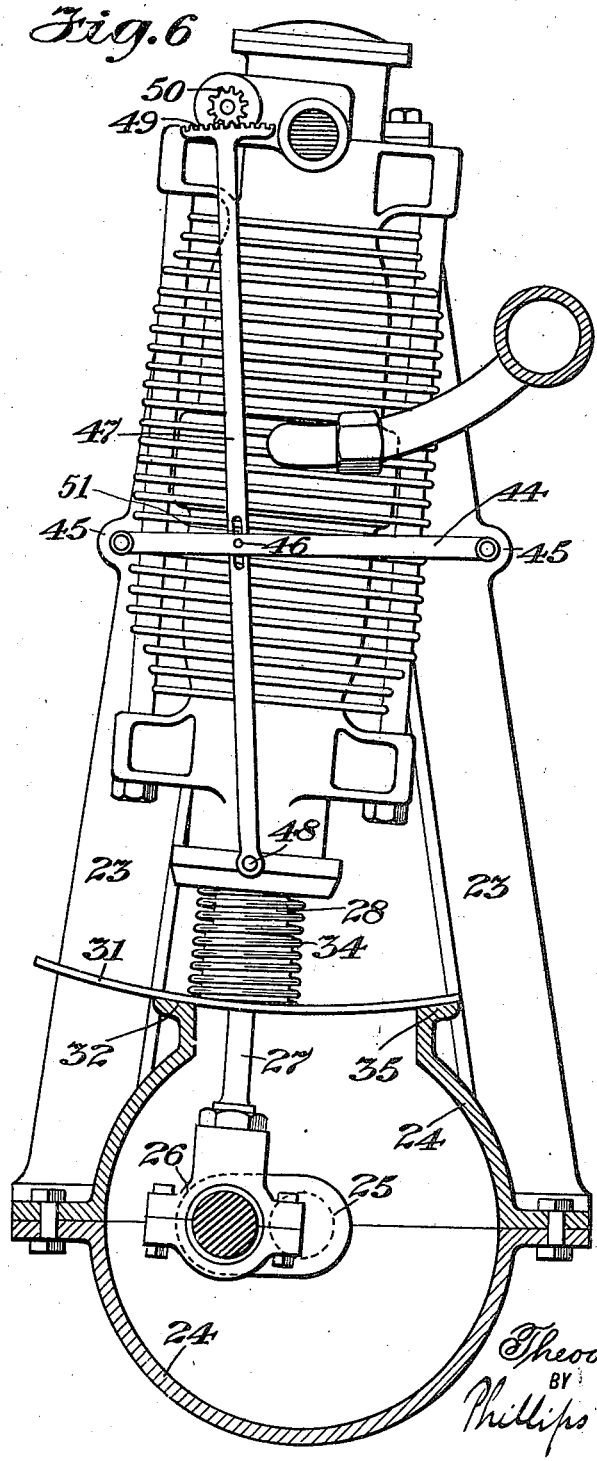

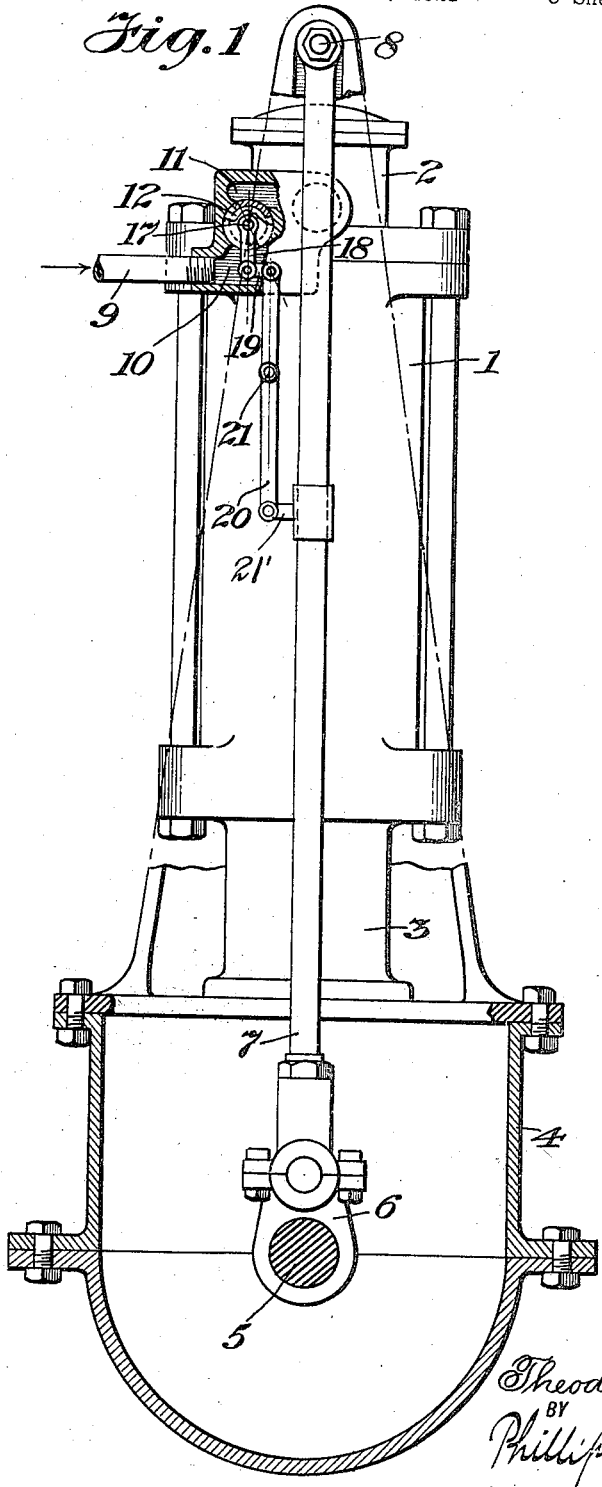

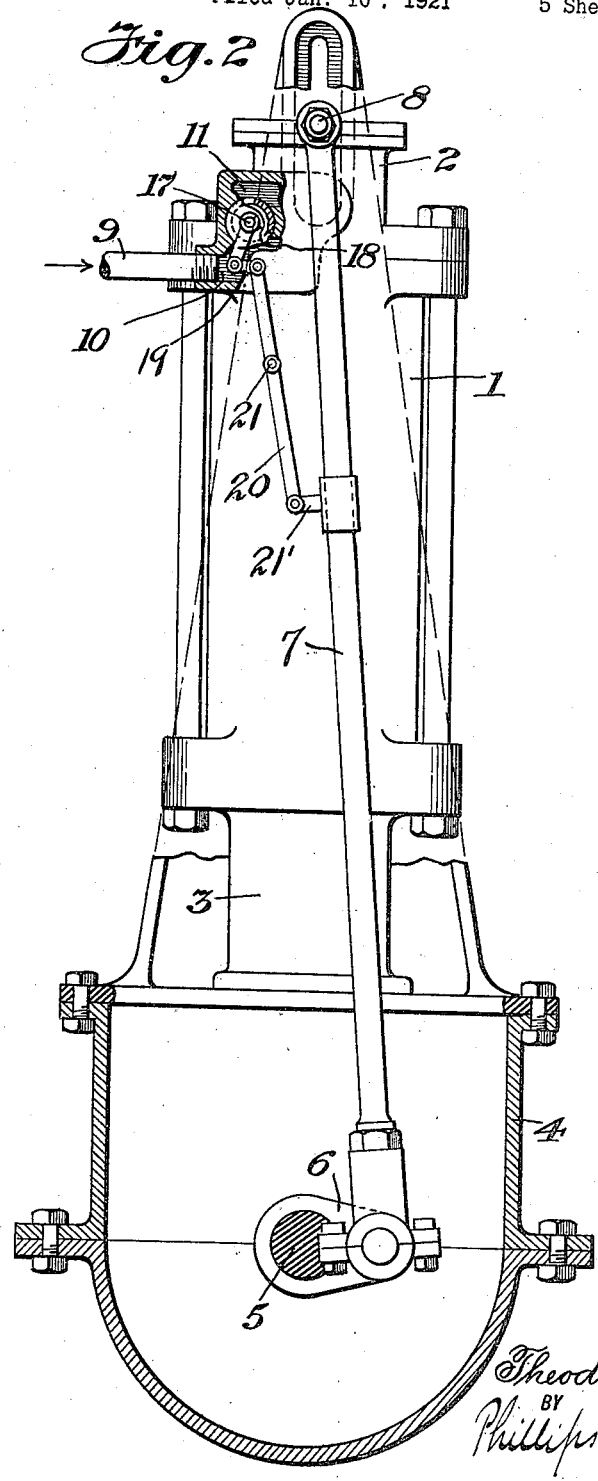

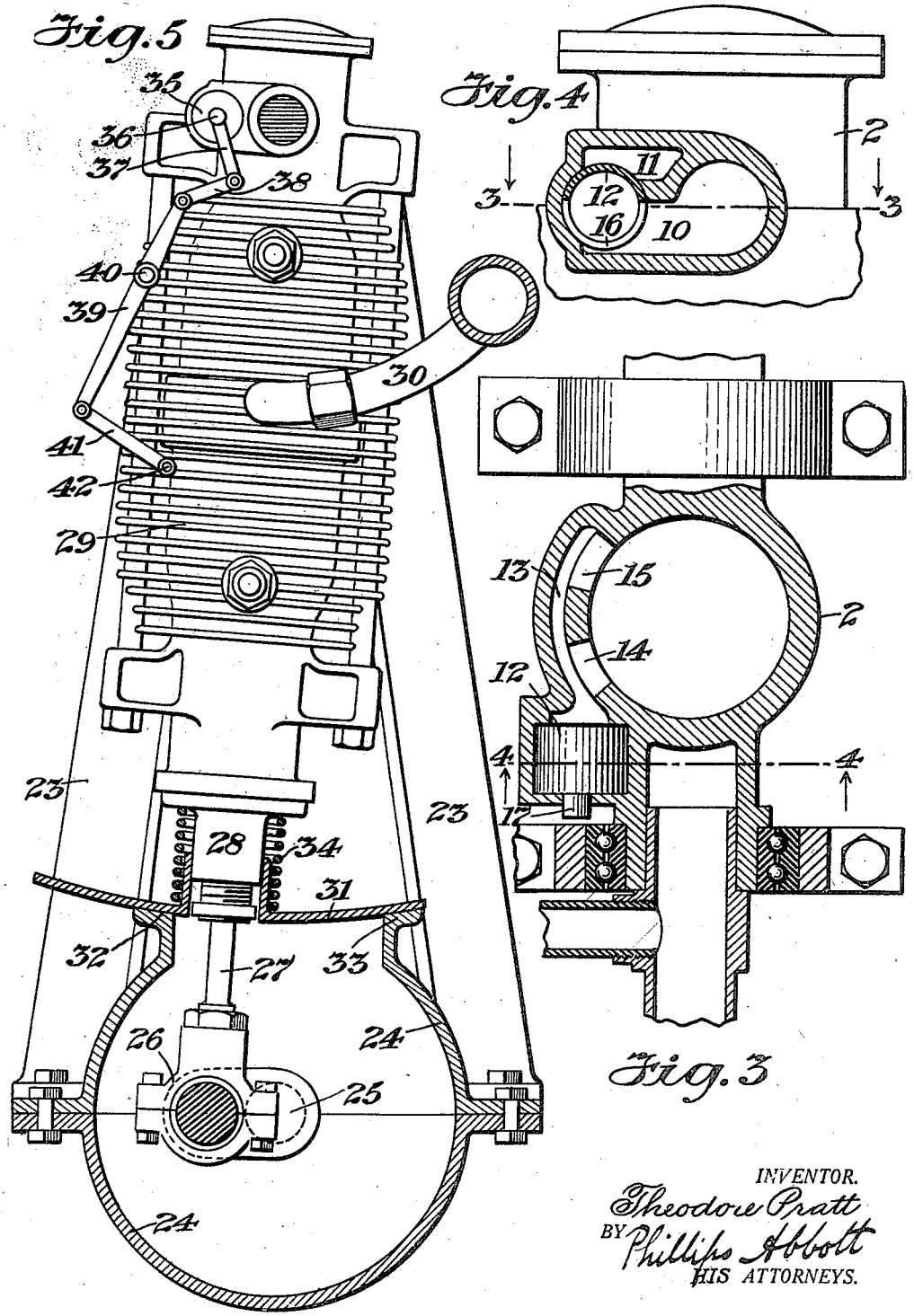

March 25, 1924.  
T. PRATT  
INTERNAL COMBUSTION ENGINE  
Filed Jan. 10, 1921  
1,488,132  
5 Sheets-Sheet 4

INVENTOR  
Theodore Pratt  
BY  
Phillips Abbott  
HIS ATTORNEY

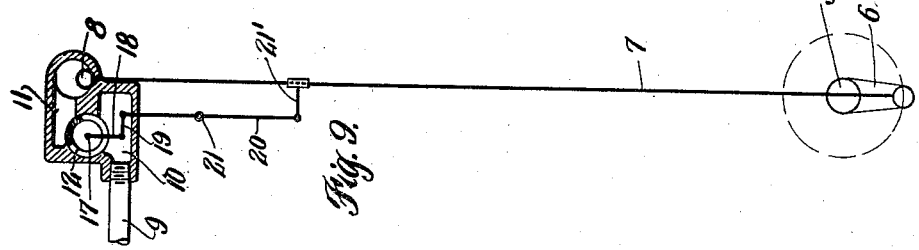
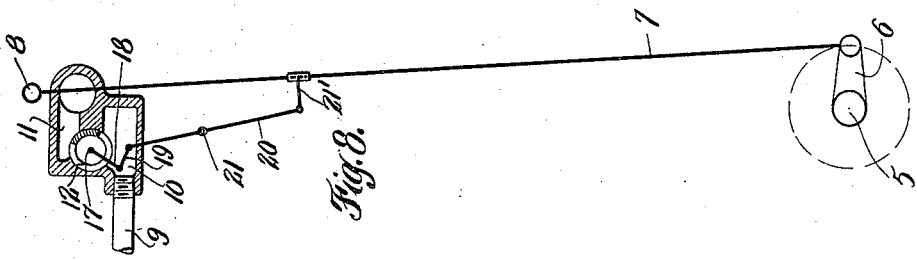
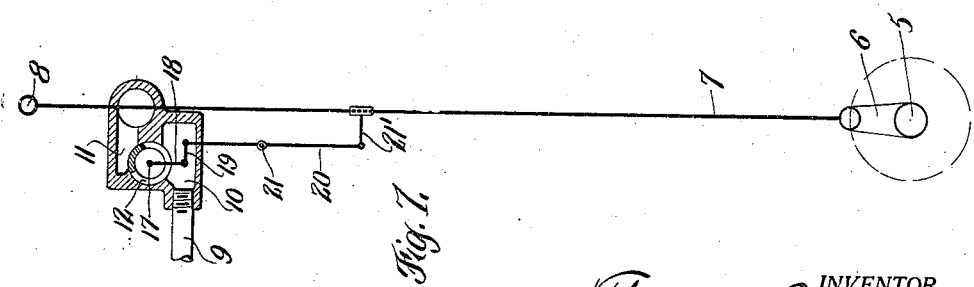

Patented Mar. 25, 1924.

1,488,132

UNITED STATES PATENT OFFICE.

THEODORE PRATT, OF GLEN COVE, NEW YORK.

INTERNAL-COMBUSTION ENGINE.

Application filed January 10, 1921. Serial No. 436,033.

*To all whom it may concern:*

Be it known that I, THEODORE PRATT, a citizen of the United States, and a resident of the city of Glen Cove, county of Nassau, and State of New York, have invented a certain new and useful Improvement in Internal-Combustion Engines, of which the following is a specification, reference being had to the accompanying drawings.

It is the purpose of this invention to so construct and combine the devices that regulate the supply of fuel to the cylinder of the engine that they shall be actuated positively by some driven part of the engine so that their operation in turn shall be positive, thus positively assuring the supply of fuel at the desired times. The parts, moreover, are so constructed and combined that they are at all times open to view so that any failure in operation may be at once detectable upon mere inspection of the parts.

The construction furthermore is such that no deposit of carbon or other obstructive material will be apt to accumulate on the controlling valve of the intake, thus avoiding a seriously annoying incident in the use of the devices now most commonly employed.

In addition to the foregoing, the construction and method of operation of the parts present in my invention are all simple, relatively inexpensive, and being large and strong in construction are unusually durable.

In the drawings—Figure 1 is a longitudinal elevation of an engine which has a stationary cylinder and coacting parts embodying my invention. Figure 2 is a view similar to Figure 1 but showing the parts in an altered position. Figure 3 is a sectional plan view of the intake valve and immediately adjacent parts taken on the line, 3—3 of Fig. 4. Figure 4 is an elevation partly in section taken on the line 4—4 of Figure 3, showing the controller valve and distributing chamber. Figure 5 is a vertical elevation partly in section showing a modified construction as applied to an oscillating engine. Figure 6 is a view similar to Figure 5 but showing a modified construction. Figures 7, 8, 9 and 10, illustrate the four positions of the parts during a complete cycle.

In the drawings I illustrate the invention as applied to a new form of engine invented by me for which I obtained Letters Patent of the United States No. 1431754, dated October 10th, 1922. This patent describes a two-cycle, double-acting internal combustion engine having a pump chamber which communicates alternately with the combustion chambers of the engine. The valve set forth in this application is especially designed to control the inflow of fuel to the pump chamber of an engine of this type, but I by no means limit myself to such new form because as will be obvious to those who are familiar with such matters, my invention may be employed in conjunction with cylinders both stationary and oscillating of many different forms, provided appropriate changes in the details of construction and arrangement of parts which those skilled will at once understand, be made.

In Figures 1 and 2 of the drawings, 1 illustrates a stationary cylinder which in the example shown has extensions 2 and 3, projecting from its opposite ends through which corresponding extensions from the piston reciprocate when the engine is in operation, all as fully set forth in my said patent. 4 is the crank case, 5 the shaft, 6 the crank, 7 one of the connecting rods which is pivotally connected at 8 to a cross head or equivalent part which is connected with the piston rod. 9 is the fuel intake pipe, 10 is the lower part of the fuel distributing chamber and 11 is the upper part thereof, 12 is the fuel controller valve which is interposed between the lower part of the chamber and its upper part; the upper part of the distributing chamber has a fuel passage 13, see Fig. 3, which connects with ports 14 and 15 through which the fuel at pre-determined times as controlled by the valve 12, passes to the interior of the cylinder or piston.

Referring now to the parts more particularly involved in the invention and to Figures 1, 2, 3 and 4, the valve 12 (see Fig. 4) is in the instance illustrated of tubular form having an opening 16 in a part of its periphery and as stated above, the valve is interposed between the lower part 10 and the upper part 11 of the distributing chamber and is supported by and moves in a seat made for it, as shown, in the casting of the distributing chamber—the axis 17 of the valve projects through the side of the casting and is provided with a crank arm 18, which is connected by a pivoted link 19 with the upper end of a vertical rod 20 which is pivoted at 21 to the cylinder or to some other fixed part of the apparatus, and at its lower end is connected to the connecting rod 7 as shown at 21'.

The operation of the form of the invention above described is as follows. Assuming that the parts are in the position shown in Figure 1, upon starting the engine the piston movements will compel the connecting rod 7 to likewise assume up and down movements, and the crank 6 as it revolves will compel the lower end of the rod at the same time to describe a circular course during each revolution of the crank so that the rod 20 because of its connection with the connecting rod through the connection 21' will be compelled to move from its position shown in Figure 1 to that shown in Figure 2, the other parts also appropriately changing their positions with the result that the valve 12 will be rotated on its longitudinal axis by the crank arm 18, whereby the fuel supplied by the intake pipe 9 to the lower part 10 of the distributing chamber will pass through the valve into the upper part 11 of the distributing chamber and thence through the fuel passage 13 and the ports 14 and 15 into the cylinder or hollow piston as the case may be. As the crank completes its revolution, the valve actuating parts assume successively a series of positions other than that above referred to as will be readily appreciated by those who are familiar with such matters, during which, of course, the valve will be positively actuated and the admission and exclusion of the fuel to and from the cylinder effected. The timing of the apparatus to effect the desired time of the passage of the fuel will, of course, depend upon the special adjustment of the parts at the time they are assembled.

In order that the foregoing may more plainly appear I illustrate in Figures 7, 8, 9 and 10 the four positions of the parts during a complete cycle.

In Figure 5, I illustrate a modified form of my invention as applied to an engine having an oscillating cylinder in which 23 is the frame, 24 the crank case, 25 the shaft, 26 the crank, 27 the piston rod, 28 the stuffing box, 29 the oscillating cylinder, 30 the exhaust. The stuffing box is provided with a sealing plate 31 which has slight movement vertically on the exterior of the stuffing box and the under surface of the plate is made on the arc of a circle defined by the swing of the lower end of the cylinder. The plate rests upon the upper edges 32 and 33 of the crank case and is held against them during its reciprocations by a spring 34, thus all spattering of the oil from the crank case is prevented.

In this construction the controller valve is seen at 35, its axis 36 is provided with a crank arm 37, which is pivotally connected by a link 38, with a rod 39, which is pivoted at 40 to some fixed part of the apparatus, and at its lower end is pivotally connected to the oscillating cylinder by a link 41, the end of which is pivoted at 42, to the cylinder or to its water jacket or other suitable part as shown.

The operation is obvious. As the cylinder oscillates the bar 39 through the link 41 is rocked on the pivot 40 whereupon the valve 35 through the link 38 and crank arm 37 is turned on its horizontal axis and the admission and exclusion of the fuel controlled as heretofore described.

In Figure 6, I illustrate still another modification of the invention, which is also adapted to use on an engine having an oscillating cylinder in this form the parts are or may be substantially the same as described in connection with Figure 5 and repetition here will not be necessary except to say that in this construction, I provide a fixed bar 44, which is rigidly attached at its ends to some immovable part of the apparatus, as for instance, the frame 45. 46 is a pin or its equivalent set in the bar 44. 47 is a vertically extending rod which is pivoted at its lower end 48 to the lower part of the cylinder and has at its upper end a rack 49, which engages with a pinion 50, on the axis of the valve. 51 is a slot in the rod 47 in which the pin 46 works as a fulcrum.

The operation of this form is also obvious; as the cylinder oscillates the rod 47, is rocked on the pin 46, and the rack 49, engaging with the pinion 50, operates the valve for the admission and exclusion of the fuel as above described.

Those who are familiar with such matters will at once understand that the examples I have described are certain forms only in which my invention may be embodied, and that many departures from the details shown by me may be made and still the essentials of my invention be retained. I, therefore, do not limit myself to such details.

I claim—

1. The combination with the cylinder of an internal combustion engine, of a fuel intake pipe, a passage through the wall of the cylinder whereby the fuel may pass from the intake to the explosion chamber of the cylinder, an oscillating fuel controlling valve interposed between the intake pipe and said passage, a crank arm on the valve, a lever fulcrumed to a fixed part of the apparatus, a link connecting the crank arm with one end of the lever, and a link connecting the other end of the lever to a moving part of the apparatus, whereby the valve is opened twice during each cycle of movement of said moving part.

2. The combination with the cylinder of an internal combustion engine, of a fuel intake pipe, a fuel passage through the wall of the cylinder whereby the fuel may pass to the explosion chamber of the cylinder, a tubular fuel controlling valve interposed between the intake pipe and said passage, a crank arm attached to the tubular valve, a lever fulcrumed to a fixed part of the apparatus, a link connecting the crank arm to one end of the lever, and a link connecting the other end of the crank arm to a positively driven part, whereby the valve is opened twice during each cycle of movement of said driven part.

3. The combination with the cylinder of an internal combustion engine of a fuel intake chamber, a passage through the wall of the cylinder whereby the fuel may pass to the explosion chamber of the cylinder, a tubular fuel controlling valve interposed between the intake chamber and said passage and having an opening in one side, a crank arm connected to said valve, a lever fulcrumed to a fixed part of the apparatus, a link connecting one end of the lever to said crank arm, and a link connecting the other end of the lever to a crank on the usual engine shaft, whereby the valve is opened twice during a complete revolution of said shaft.

THEODORE PRATT.